United States Patent [19]

Lacoste

[11] Patent Number: 5,628,548
[45] Date of Patent: May 13, 1997

[54] VEHICULAR PASSENGER RESTRAINT SYSTEMS

[76] Inventor: Marvin Lacoste, P.O. Box 292, Kiln, Miss. 39556

[21] Appl. No.: 608,501

[22] Filed: Feb. 28, 1996

[51] Int. Cl.$^6$ .......................... A62B 35/00; B60R 21/00; B60R 22/12
[52] U.S. Cl. ................ 297/484; 297/464; 297/467; 297/465; 297/485
[58] Field of Search .................... 297/484, 485, 297/465, 467, 464

[56] References Cited

U.S. PATENT DOCUMENTS

| | | | |
|---|---|---|---|
| 1,930,378 | 10/1933 | Beagan | 297/484 |
| 2,979,028 | 4/1961 | Zakely | 297/484 X |
| 3,301,594 | 1/1967 | Pukish, Jr. | 297/467 |
| 3,321,247 | 5/1967 | Dillender | 297/484 X |
| 3,428,029 | 2/1969 | Klickstein et al. | 297/484 |
| 3,612,605 | 10/1971 | Posey, Jr. | 297/484 |
| 3,834,758 | 9/1974 | Soule | 297/389 |
| 3,887,233 | 6/1975 | Garavaglia et al. | 297/484 X |
| 3,954,280 | 5/1976 | Roberts et al. | 297/484 X |
| 4,050,737 | 9/1977 | Jordan | 297/465 |
| 4,226,474 | 10/1980 | Rupert et al. | 297/484 |
| 4,488,691 | 12/1984 | Lorch | 297/484 X |
| 4,632,425 | 12/1986 | Barratt | 297/484 |
| 4,709,966 | 12/1987 | Farkinson et al. | 297/484 |
| 4,758,048 | 7/1988 | Shuman | 297/464 X |
| 4,927,211 | 5/1990 | Bolcerek | 297/484 X |
| 5,005,865 | 4/1991 | Kruse | 297/464 X |
| 5,056,869 | 10/1991 | Morrison | 297/467 X |
| 5,080,191 | 1/1992 | Sanchez | 297/465 X |
| 5,080,441 | 1/1992 | Stevenson et al. | 297/467 |
| 5,131,683 | 7/1992 | Johnson | 297/484 X |
| 5,190,306 | 3/1993 | Nauman et al. | 297/243 X |
| 5,215,354 | 6/1993 | Grene | 297/484 X |
| 5,248,187 | 9/1993 | Harrison | 297/482 |
| 5,354,121 | 10/1994 | Allum | 297/485 |
| 5,397,171 | 3/1995 | Leach | 297/485 X |
| 5,540,403 | 7/1996 | Standley | 297/484 X |

FOREIGN PATENT DOCUMENTS

| | | | |
|---|---|---|---|
| 702240 | 1/1965 | Canada . | |
| 4401702 | 8/1994 | Germany | 297/465 |
| 969687 | 9/1964 | United Kingdom | 297/465 |
| 1314321 | 4/1973 | United Kingdom | 297/484 |

OTHER PUBLICATIONS

American Safety Equipment Corporation of California and New York.

*Primary Examiner*—Peter M. Cuomo
*Assistant Examiner*—Rodney B. White
*Attorney, Agent, or Firm*—Pravel, Hewitt, Kimball & Krieger

[57] ABSTRACT

A safety restraint system for vehicles such as airplanes, which includes a primary support harness having an upper support portion secured to an upper portion of an airline seat, a lower support portion secured to the upper support portion so that the lower support portion extends across the torso of an adult person seated in the airline seat, the system further including loops on the ends of the lower support portion for accepting the airline safety seat belt for securing the belt against the torso of the person on the seat. There is further included a secondary support harness having shoulder straps and a waist board for positioning upon a child seated on the adult's lap with second loops on the ends of the lower support portion for threading the waist belt therethrough sad engaging itself around the child so that the waist belt secures the child in place on the adult's lap. The primary support harness and the secondary support harness are fixed as one via a frame element on the rear of the secondary support harness for serving as the attachment point between the primary support harness worn by the adult and the secondary support harness worn by the child.

20 Claims, 9 Drawing Sheets

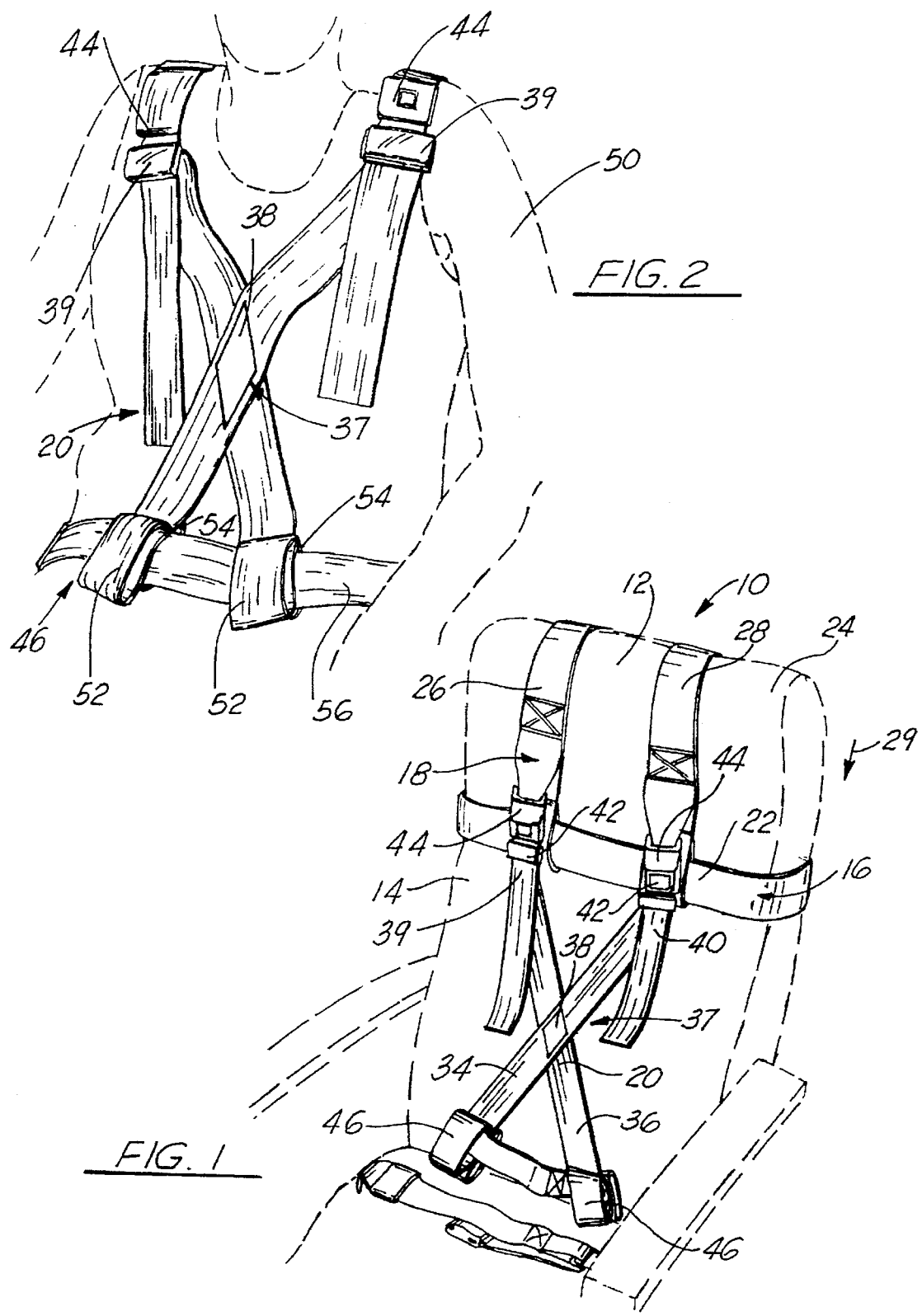

VEHICULAR PASSENGER RESTRAINT SYSTEMS

BACKGROUND OF THE INVENTION

1. Field of the Invention

The system and apparatus of the present invention relates to vehicle restraints. More particularly, the present invention relates to a restraint system for passengers in both land based vehicles such as automobiles and airborne vehicles such as commercial airliners, to more safely restrain a passenger against injury in potential crash situations.

2. General Background

With vehicular and airborne travel rapidly increasing, one of the most difficult areas to address, is the safety of the passengers in automobiles and airplanes. There have been numerous safety standards adopted by both the National Highway Board, and the Federal Aviation Administration (FAA), which address safety in the context of seat restraint systems for the passengers in automobiles and in airplanes. However, a review of the current state of the art, finds these restraint systems somewhat lacking. For example, in automobiles, although the restraint system for the driver which is always an adult, is sufficient to protect the adult in most instances. However, in an attempt to protect children or an invalid, such is not the case. For example, usually the shoulder restraint which is present in automobiles is adapted for an adult, and forms a diagonal path across the chest of an adult. However, for a child, often times this path is around the neck or head of the child, and offers no assistance in the protection of the child who may easily slip out of the shoulder restraint and be held in place only by the waist belt which may do some damage to the child.

Furthermore, although it is usually illegal, an adult will place a very small child on the adult's lap, in the automobile, thinking, however wrongly, that by holding onto the child should an accident occur, the child would be protected. However, it is in most instances when such occurs, the child is flung from the adults arms and strikes the windshield, dashboard or doors of the vehicle either injuring or killing the child. This problem is likewise faced by airline passengers.

Again, it is often common that the mother or father of a child will hold the small child in the parent's arms during takeoff or landing, and in the event that the landing or takeoff is rough, or worse yet, ends in a crash, again the child is totally unprotected and is very vulnerable to injury or death. Likewise, an invalid, who may be placed in a standard airline seat, having a waist belt, is for the most part unable to protect himself or herself, should there be an accident, and the invalid would suffer in most cases more damage than would a normal person who may be able to take rational precautions in protecting oneself.

Therefore, there is a need in the art for a system which would assist in protecting infants and invalids against accidents when there are passengers in either land vehicles such as automobiles and trucks, or in aviation vehicles such as airplanes. A review of the art is referenced in the prior art statement being submitted with this application.

SUMMARY OF THE PRESENT INVENTION

The system of the present invention provides a solution to the problems in the art in a simple and straightforward manner. In the principal embodiment which relates to securing a child in an adult's lap in an airline seat, there is provided a first principal harness which is positioned onto the upper portion of the airline seat, the harness including a first transverse belt member surrounding the back portion of the seat, and a pair of vertical members extending upward from the rear of the transverse belt member and over the upper end of the seat back, the vertical members further including each a buckle member which would be positionable over the shoulders of an adult who would be seated within the seat for further use. The harness further comprises a lower portion, formed by a pair of vertically downward depending straps with the upper ends of the straps insertable into the buckles of the upper portion of the harness and the X configuration of the straps laid over the chest and abdomen of the adult seated in the seat. The lower end of the straps would include each a pair of loop members with the inner loop members allowing passage of the airline belt therethrough, so that when the airline seat belt is buckled in place, the adult is being held firmly in place by the X configuration straps extending from the upper buckles down to the lower belt or airline seat belt.

The second pair of loops at the lower end of the straps would be in place for securing a secondary harness thereto. The secondary harness would be worn by the infant, likewise having a pair of shoulder members extending from a belt member around the child's waist. The belt member would thread through the pair of loops in the adult's harness, and would buckle thus holding the child in place on the lap of the adult. Further, the child's harness would include a forward pad member which would press against the abdomen of the child and help restrain the child as he is held in place on the mother's lap. The waist strap of the child would also include a pair of belt members which would thread through the opening of the legs of the child so that the belt could be attached to a hook member so that the child is prevented from sliding through the harness on a sudden stop or impact. There would be further provided a frame element on the rear portion of the strap for allowing the strap to be threaded through the element, with the element being substantially the width of the child's back so that should the child pull forward, the straps would extend forward from the ends of the fixture and would not squeeze at the abdomen portion of the child.

The second embodiment of the invention addresses it use with automobiles. Again, the child would be wearing the secondary harness as described previously, but in this situation, the rear loops in the harness would be threaded through with the seat belt of the automobile, and the child would be held in place on the seat should there be a sudden stop. Because the harness has shoulder straps, the harness would prevent the child from falling forward or from sliding out of the seat belt as is normally the case.

Therefore, it is the principal object of the present invention to provide a restraint system for passengers of land based vehicles or airborne vehicles, which would allow a child to be placed within the restraint system and would be held in place by the system;

It is a further object of the present invention to provide a safety restraint system particularly usable for children seated on the lap of an adult in an airplane, so that the child is held in place while the child is seated on the adult's lap in a sudden stop or interruption of flight of the airplane;

It is a further object of the present invention to provide a secondary restraint system for children, which may be used in an automobile system so that a harness in which the child is placed is attached to the seat belt of the automobile and prevents the child from sliding forward should there be a sudden stop of the automobile;

It is a further object of the present invention to provide a restraint system for an invalid on an airplane, which allows the invalid to be strapped and placed on the airplane and not be able to move around easily during flight should it be necessary.

BRIEF DESCRIPTION OF THE DRAWINGS

FIG. 1 illustrates an overall view of the primary restraint harness of the present invention positioned on an airline seat;

FIG. 2 illustrates the harness of the restraint system as illustrated in FIG. 1 with an adult strapped therein;

DETAILED DESCRIPTION OF THE PREFERRED EMBODIMENT

FIGS. 1–14 illustrate the preferred embodiment of the vehicular restraint system as utilized in the present invention, with FIGS. 1–10 illustrating the preferred embodiment of the system as utilized in airplanes, and FIGS. 11–14 illustrating the preferred embodiment of the apparatus utilized as a secondary restraint system in vehicles.

Figure 4:
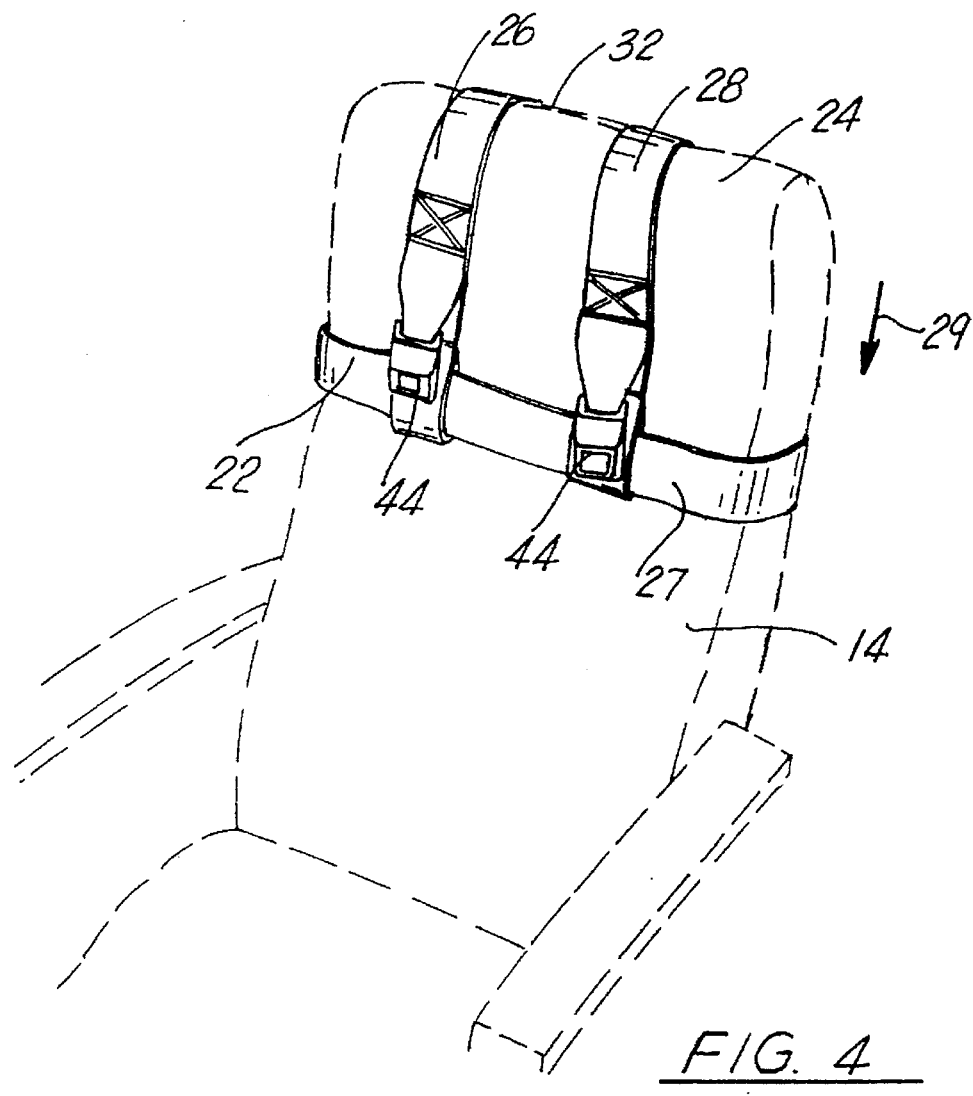
FIG. 4 illustrates the upper harness portion of the apparatus of the present invention secured around an airline seat.
Figure 3:
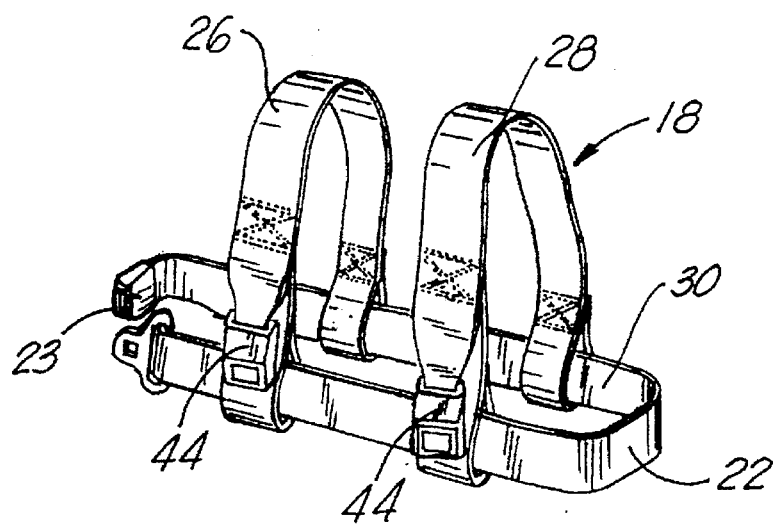
FIG. 3 illustrates an overall view of the upper harness portion of the overall apparatus as illustrated in FIG. 1.

Turning now to the principal embodiment as illustrated in FIGS. 1–10, reference is made to FIG. 1 which illustrates the system 10 positioned on the back portion 12 of an airline seat 14 as illustrated. As illustrated in FIG. 1, system 10 includes a principal harness 16, which includes an upper portion 18, which is more thoroughly illustrated in FIGS. 3 and 4, and a lower portion 20 as seen in FIG. 2, which is engagable into upper portion 18, to complete the entire harness 16. Referring now to FIG. 1, it can be seen that the upper harness 18, includes a continuous transverse strap portion 22, which surrounds the upper part 24 of an airline seat 14, and is buckled there onto for securing it in place as illustrated in FIGS. 1 and 4. The upper portion 18 further includes a pair of loop shoulder portions 26, 28, which extend from the rear portion 30 of the transverse member 22, looping over the upper edge 32 of the seat 14, to be held in place around the upper part 24 of the front part 27 of the transverse strap 22. The portion 18 would be slidably engaged in the direction of arrow 29 down upon the seat as illustrated in FIGS. 1 and more particularly in FIG. 4. As seen in FIG. 3, strap 22 engages around seat 14 through a buckle 23, to hold it firmly in place.

The next step in the process would be to secure the lower harness portion 20 which is illustrated in FIG. 1. Lower portion harness 20 includes a pair of vertically depending cross members 34 and 36, which form an X pattern 37 and are stitched together at point 38 along their center. The upper ends 39, 40 of the X members would include a latching member 42 which would latch into a pair of buckle members 44 on the upper harness 18, and their lower ends would include each a pair of loop portions 46, the function of which will be described further.

Turning now to FIG. 2, an adult person 50, has been seated in seat 14, with the X portion 37 of the lower harness 20, laying on the person's chest, again with the upper ends 39 buckled into the buckles 44, of the upper harness 18. The loop portion 46 includes forward loops 52 and rear loops 54, at the lower ends of the X straps 34, 36, with the standard airline seat belt 56, threaded therethrough for holding the adult in place as seen in FIG. 2. At this point, it should be noted that if the adult were an invalid, whom one may wish to restrain the movement of, this harness could be utilized for this purpose in this configuration and would be a means for maintaining the invalid in position on the seat and unable to move about easily.

It should be noted however, that an adult, although held within the restraint system as illustrated in FIGS. 1 and 2, is able to move forward a certain distance away from the airline seat 14, and is not totally held fast against the seat 14. However, such movement is restrained in the sense that the adult would not extend all the way forward to make contact with the seat directly ahead of the adult.

Figure 5:
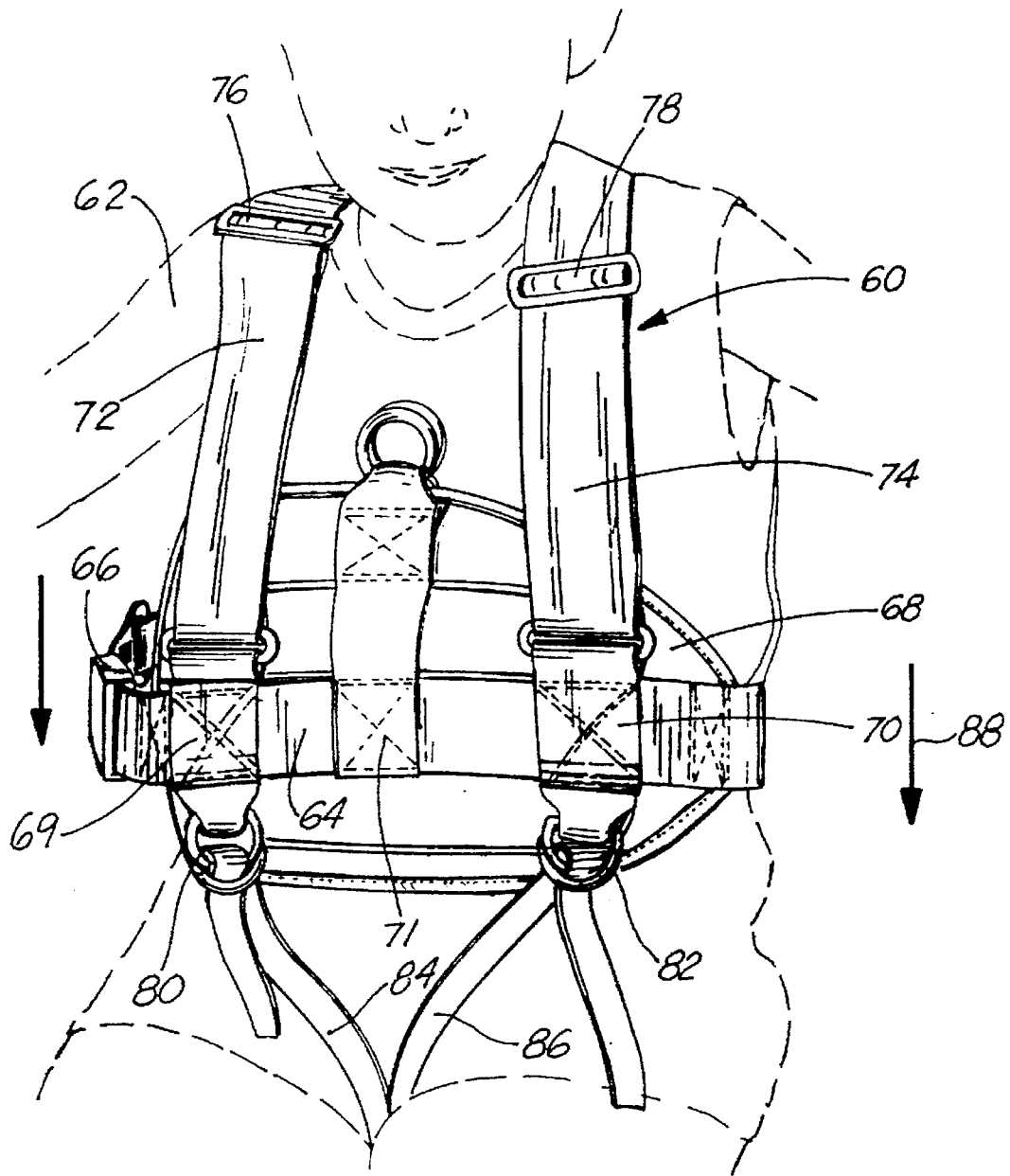
FIG. 5 illustrates a front view of a larger child placed in the child restraint portion of the apparatus of the present invention.
Figure 6:
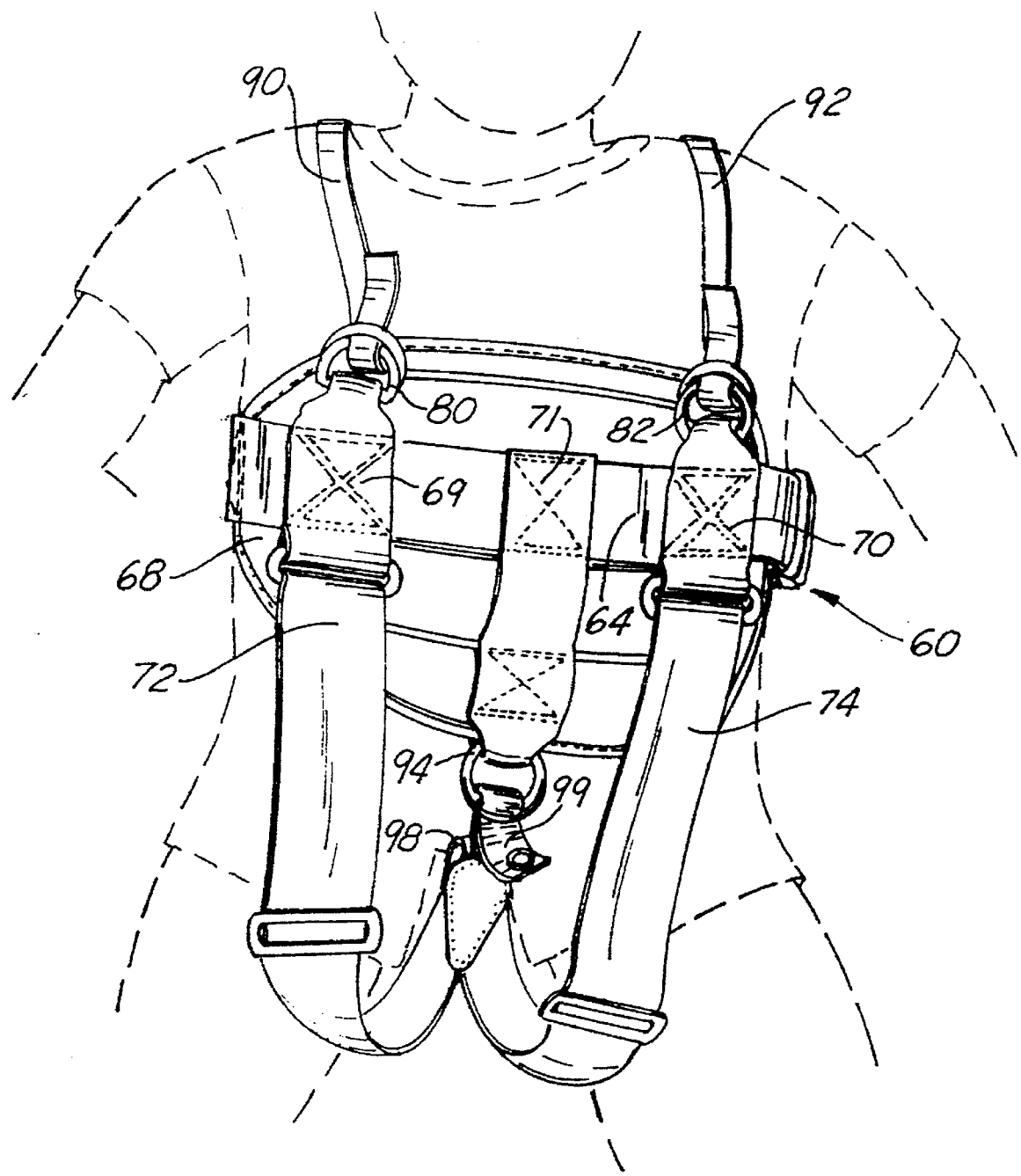
FIG. 6 illustrates a front view of a smaller child placed in the child restraint portion of the apparatus of the present invention.
Figure 7A:
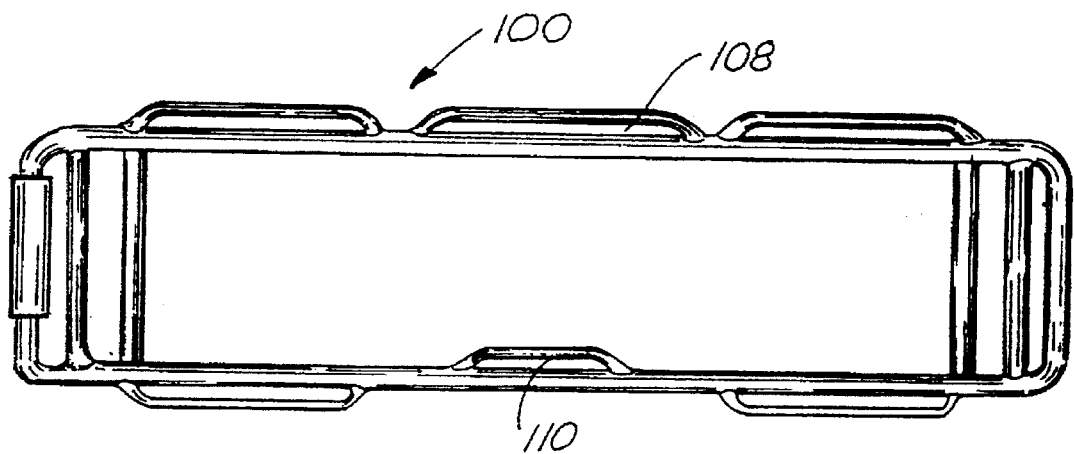
FIGS. 7A and 7B illustrate overall and partial views respectively of the rear element securing the adult restraint portion to the child restraint portion of the present invention.
Figure 7B:
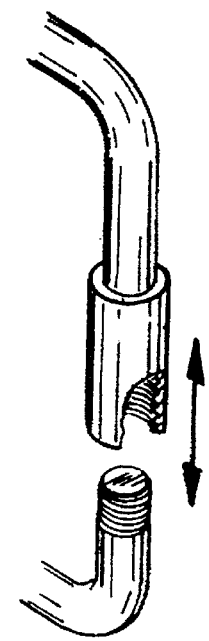

In the primary use of this particular harness as illustrated in FIG. 1 in overall view, this harness would be utilized in conjunction with the child's harness so that a child may be placed on the seat of the adult, with the child's harness adaptable for maintaining either a larger or smaller child. Reference is now made to FIGS. 5 through 7 respectively, which illustrate the child's harness 60 with a child 62 supported therein, with FIG. 5 illustrating the harness 60 as utilized on a larger child, and FIG. 6 illustrating the harness 60 used on a smaller child, that is a child less than lbs. 60 in weight.

Turning now to FIG. 5, the child's harness 60 would include an overall transverse waist belt 64 which would be secured around the waist of the child 62 and would buckle on the side of the child via buckle 66 as illustrated in FIG. 5. The waist belt 64, would include a forward substantially protection pad 68, constructed of soft, pliable material, which would conform to the shape of the child's abdomen, and would serve as a means for cushioning any impact that the child may make with the belt 64, should the child move forward due to impact or a sudden stop of the airplane while the child is a passenger. It should be noted that the flat protector pad 68, is stitched along three points 69, 70, and 71, to the transverse strap member 64, for holding it in place. Likewise, there is provided a pair of shoulder straps 72, 74, which are adjustable at points 76, 78 for securing firmly over the child's shoulders, so that the child is held in place within the harness as illustrated. Each of the lower ends of the straps 72, 74 are again stitched at points 69, 71, to the transverse strap 64, to define the upper portion of the harness for holding the child in place. At each lower end of each strap 72, 74, there is provided metal loops 80, 82, which engage a pair of straps 84, 86 which would attach from a rear frame member as will be discussed further, and thread through the legs of the child and would loop through the metal rings 80, 82 in order to provide a means for preventing the child from slipping downward in the direction of arrows 88, should there be a sudden stoppage in which event the child will tend to slide forward, but would be held in place via straps 84, 86.

Addressing the use of the harness in a smaller child, FIG. 6 provides the harness 60 as would be reversed in the position as seen in FIG. 5. That is, in FIG. 6 the harness 60 would be moved so that the leg straps 84, 86 which would normally hold the larger child in place threaded through its legs, would be come the shoulder straps 90 and 92, for the smaller child or infant, with the pad member 68 continuing to provide its function, but with the larger shoulder straps 72, 74 that were used as seen in FIG. 5, simply hanging in place in that they would have no further use at this point. However, it should be noted that there is provided a single ring member 94, as seen in FIG. 5 on the upper end of the pad 68 but is now on the lower end of the pad 68, so that again a second strap 98 could feed from the rear of the harness, through the child's legs and be held in place via ring 94 on its front end 99, again, so that the child wouldn't slide forward. The only difference between these two embodiments is the fact that the child's harness in FIG. 5 is rotated 180 degrees, with the leg straps 84, 86 in FIG. 5 being used as shoulder straps 90, 92, for the smaller child or infant, as seen in FIG. 6. The two larger shoulder straps 72, 74, would not be put to any use other than being held in place as illustrated in FIG. 6.

Figure 8:
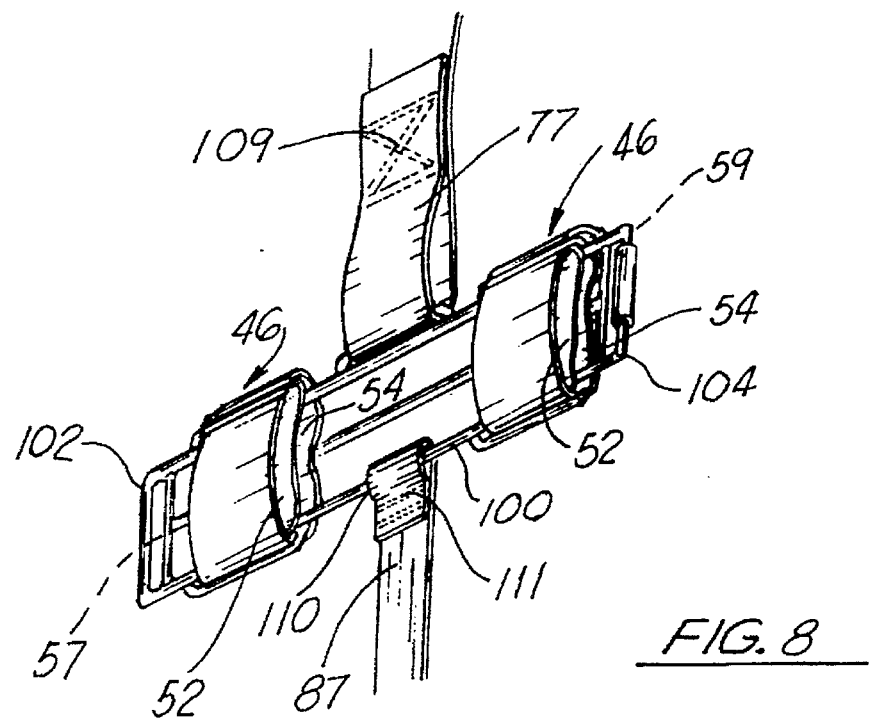
FIGS. 8 and 9 illustrate overall views of the frame element which would secure the child support portion to the adult support portion of the present invention.
Figure 9:
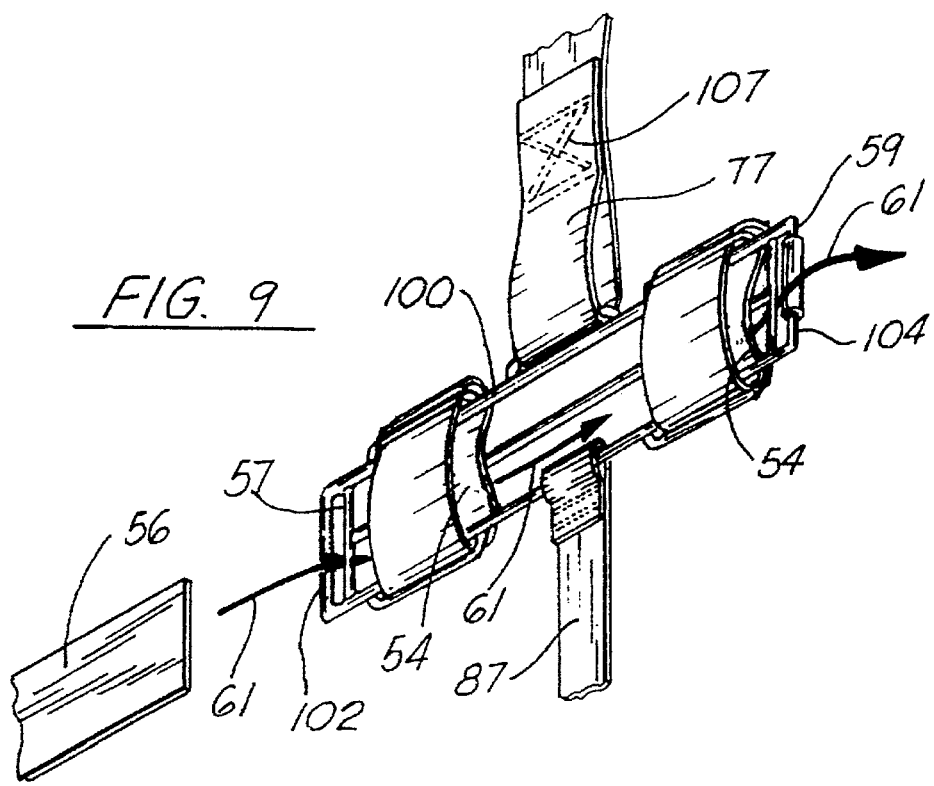

FIGS. 7 through 9 would illustrate the apparatus or frame which would be utilized in conjunction with the child's harness for securing the child's harness onto the harness of the adult. As seen in FIGS. 7 through 9, what is provided is a frame member 100 extending substantially the width of the child's back from a first end 102 to a second end 104, with the frame member 100 including a plurality of openings therein for allowing the straps 84, 86 to be threaded therethrough. The frame member 100 would also include a central upper opening 108, and central lower opening 110, each of the openings 108 and 110 as seen in FIG. 7, having the shoulder and leg straps attached therethrough so that they are held in place and can be strapped onto the child as illustrated in FIGS. 5 and 6. That is, the shoulder straps 72, 74 as seen in FIG. 5, would converge into a single strap 77, as seen in FIG. 8, which would thread through upper opening 108, and would be stitched at point 109 as seen in FIG. 8. Likewise, leg straps 84, 86, as seen in FIG. 5, would also thread through and converge into a single strap 87, which would again loop through lower opening 110, and would stitch back onto itself at point 111 so that both the shoulder and the leg straps would be secured in place. Frame member 100 would also include means for attaching the loop system 46 as was discussed earlier of the principal harness as seen in FIG. 2. The pair of forward loops 52 and a pair of rear loops 54 would serve as the connection means between the adult harness 10 and the child harness 60. As seen in FIG. 9, the seat belt 56, would thread through the end openings 57 then through the rear loops 54 of the loop system 46, then through second opening 59 (see arrow 61) and would engage as seen in FIG. 2, around the lap of the adult. When the child's harness is placed on the child, as seen in FIG. 5, the end of the transverse belt member 64 would loop through the forward loops 52, as seen in FIG. 2, and would buckle upon itself as seen in FIG. 5 via buckle member 66. Therefore, the element 100 would serve as a point of attachment between the child and the adult, with the waist belt 64 of the child's restraint system threading through the forward loops 52 and buckling via buckle 66, and the airplane seat belt 56 threading through the rear loop members 54, and buckling onto itself around the torso of the adult. Therefore, both are held in place via the system.

Figure 10:
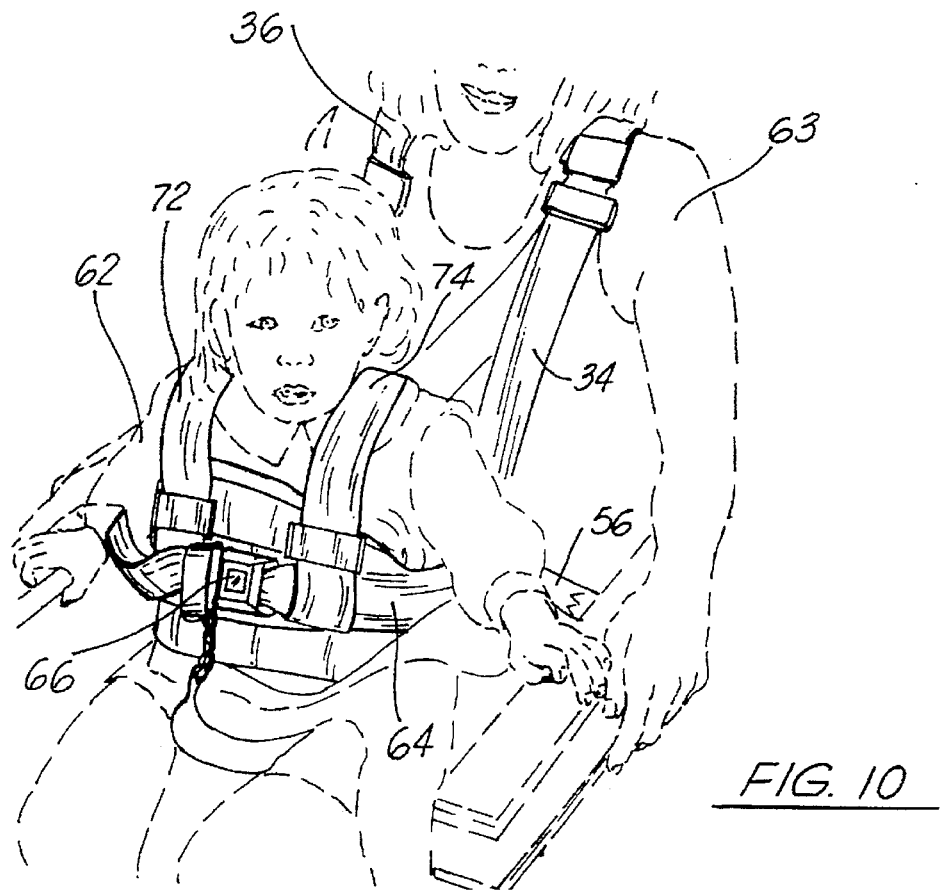
FIG. 10 illustrates an overall front view of a child housed within the child restraint portion on the lap of an adult housed within the adult restraint portion of the preferred embodiment of the apparatus of the present invention.

As is illustrated in FIG. 10, a larger child 62, is seated within the lap of the mother 63, with the child's harness 60 in place on the child 62 as illustrated in FIG. 5. As is illustrated, and as was discussed earlier, the child's harness 60 would be secured in place onto the mother's harness 10 by the system as illustrated in FIGS. 7 through 9 as likewise was discussed earlier. In this configuration, it is clear that the mother is held in place by the airline seat belt 56 and the cross members 34, 36, and the child, although seated in the mother's lap, is held in place by the frame member 100, through which the airline seat belt 56 is threaded, with the rear portion of the child's harness 60, secured thereto so that the child 62 cannot move forward off the mother's lap.

Figure 13:
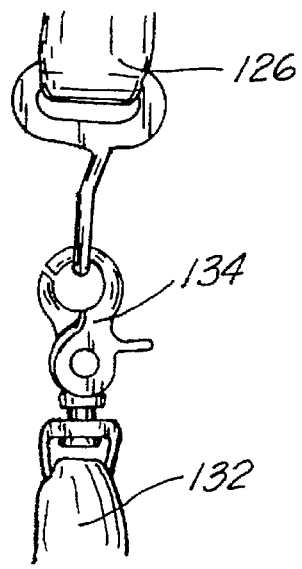
FIG. 13 illustrates the attachment between the leg strap and the transverse belt member in the vehicle restraint system of the present invention.
Figure 11:
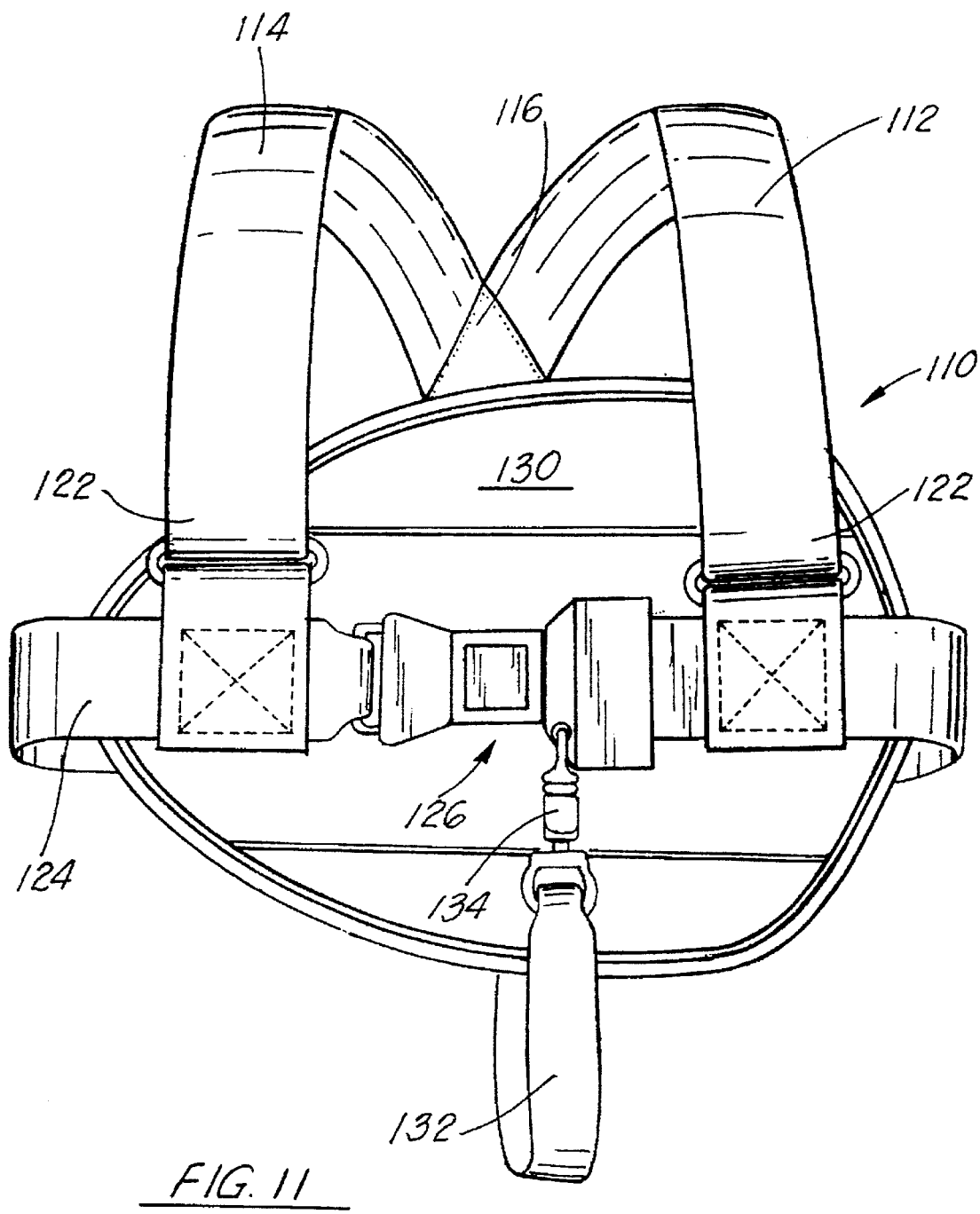
FIG. 11 illustrates an overall view of a child restraint harness of the present invention for use in motor vehicles.
Figure 12:
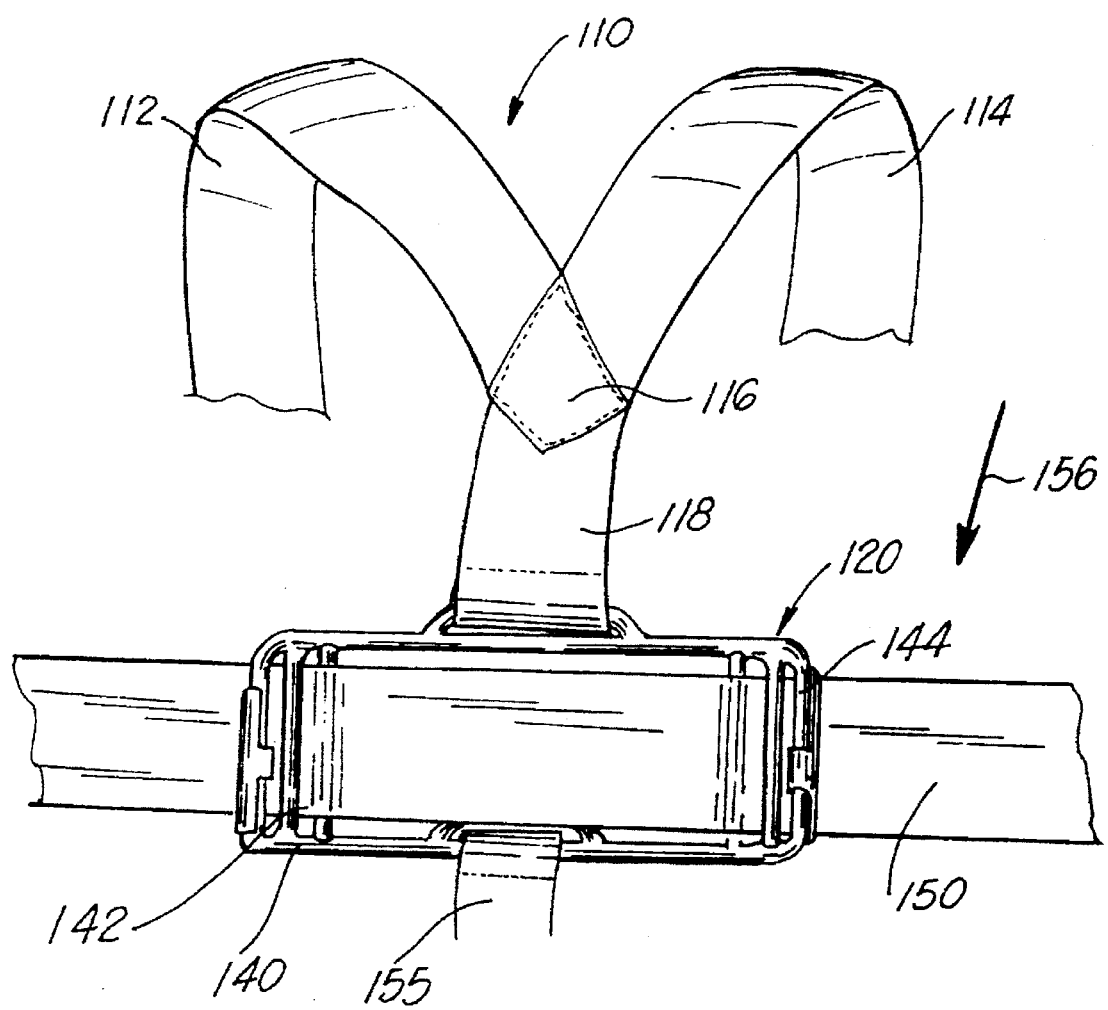
FIG. 12 illustrates the rear view of the apparatus illustrated in FIG. 11.

Turning now to FIGS. 11-13, there is illustrated the embodiment of the apparatus which is utilized in an automobile. As illustrated in forward view, the automobile version of the apparatus would include a principal harness 110, having a pair of shoulder straps 112, 114, the shoulder straps terminating on their rear end 116 into a single strap 118, secured to an element 120 as will be discussed further, and the forward ends 122 of the straps 112, 114, having stitched to a transverse belt member 124, the transverse belt member 124 including a buckling system 126 on its forward end for buckling onto a child. There is further included an elongated flat protection pad 130 as was discussed in the earlier embodiment, for placing against the chest of the child when the harness 110 is worn by the child. Further, there is included a single strap member 132, which extends from the rear of the element 120, through the child's legs and would clip via clip member 134, onto the forward buckle 126 of the transverse belt 124 as seen in FIG. 13.

As is illustrated, the harness 110 would fit onto the child in a manner that closely resembles the airline harness as is illustrated in FIG. 5. For example, the pair of shoulder straps 112, 114, would extend forward over the shoulders of the child, and again would be stitched onto the transverse belt 124. The transverse belt 124 would wrap around the waist of the child and would buckle through the buckling system 126 as was described earlier.

Figure 14:
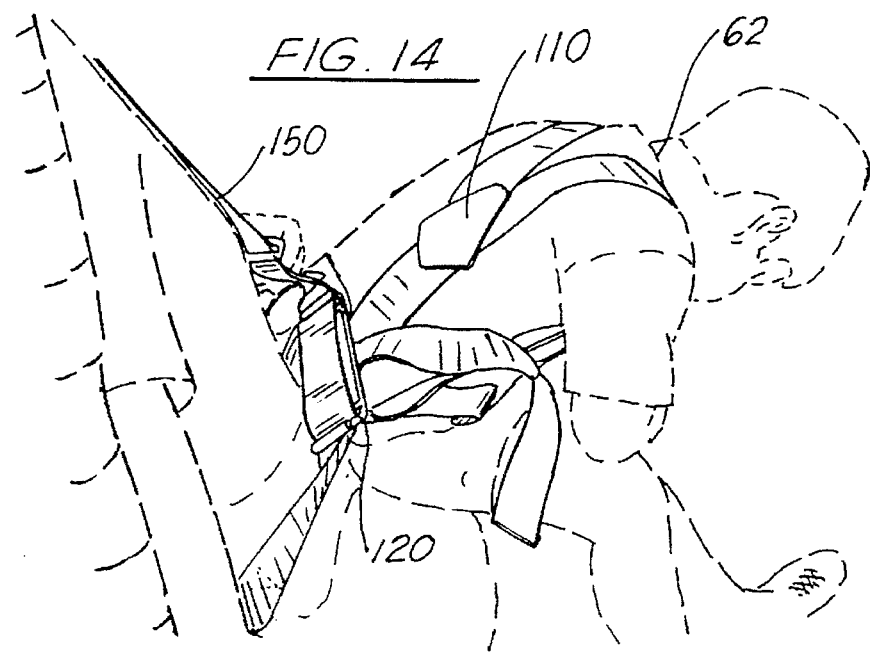
FIG. 14 illustrates an overall view of a child secured in the vehicle restraint system of the present invention.

With the harness in place on the child, reference is made now to FIG. 12 where there is illustrated the element 120, which would allow the harness 110 to be utilized with a seat belt as is illustrated in FIG. 14. As seen in rear view in FIG. 13, the element 120 would include an elongated metal frame 140, having a pair of openings 142, 144 at each end, with each of the openings providing a means for threading a seat belt 150 therethrough. Once the seat belt 150 is threaded therethrough, the seat belt 150 would be tightened in place, as illustrated in FIG. 14, and therefore the element 120, as seen in FIG. 14, would serve to hold the child in place against the seat belt on the seat of the automobile. Likewise, as was in the embodiment utilized for airplanes, in order to prevent the child from sliding through the under portion of the belt 124, there is provided a leg strap 155, which extends from the lower end of the metal element 120, as seen in FIG. 12, and wraps between the legs of the child and hooks onto the buckle 126 of belt member 124, as seen in FIG. 11.

Therefore, the child could not slide down in the direction of arrow 156, as illustrated in FIG. 12, should there be a sudden stop of the vehicle.

FIG. 14 is a side view of a child held within the principal harness 110 as discussed earlier, with the element 120 in position as illustrated. As is seen, the seat belt 150 of an automobile is likewise threaded through the openings 142, 144, of element 120, and is buckled onto itself. Therefore, should the car have a sudden stop, the child is held in place via harness 110, by the seat belt 150 so that the child cannot move forward in the automobile. It should be noted that as illustrated in FIG. 14, the child is seated on an adult and the adult's seat belt is holding the child in place. Although this is not recommended for safety reasons, on a practical level, a child is often seated in an adult's lap in a vehicle, and therefore, this type of secondary restraint system can be utilized quite simply with an adult's seat belt, which would secure an adult in place but would not necessarily secure the child in place on an adult's lap without the secondary restraint system.

The following table lists the part numbers and part descriptions as used herein and in the drawings attached hereto.

PARTS LIST

| Description | Part No. |
| --- | --- |
| system | 10 |
| back portion | 12 |
| airline seat | 14 |
| principal harness | 16 |
| upper portion | 18 |
| lower portion | 20 |
| transverse strap portion | 22 |
| upper part | 24 |
| shoulder portions | 26, 28 |
| front part | 27 |
| arrow | 29 |
| rear portion | 30 |
| upper edge | 32 |
| cross members | 34, 46 |
| x pattern | 37 |
| upper ends | 39, 40 |
| latching member | 42 |
| buckle members | 44 |
| loop portions | 46 |
| adult | 50 |
| forward loops | 52 |
| rear loops | 56 |
| child's harness | 60 |
| arrow | 61 |
| child | 62 |
| transverse waist belt | 64 |
| buckle member | 66 |
| protection pad | 68 |
| three points | 69, 70, 71 |
| shoulder straps | 72, 74 |
| points | 76, 78 |
| strap | 77 |
| metal loops | 80, 82 |
| straps | 84, 86 |
| arrows | 88 |
| shoulder straps | 90, 92 |
| ring member | 94 |
| front end | 99 |
| frame member | 100 |
| first end | 102 |
| second end | 104 |
| central upper opening | 108 |
| point | 109 |
| central lower opening | 110 |
| principal harness | 110 |
| should straps | 112, 114 |
| rear end | 116 |
| single strap | 118 |
| metal element | 120 |
| forward ends | 122 |
| transverse belt member | 124 |
| buckling system | 126 |
| forward buckle | 126 |
| protection pad | 130 |
| single strap member | 132 |
| clip member | 134 |
| frame | 140 |
| openings | 142, 144 |
| belt | 150 |
| leg strap | 155 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A safety restraint system for airplanes, comprising:
   a) a primary support harness, comprising:
   i) an upper support portion for securing to an upper portion of an airline seat;
   ii) a lower support portion secured to the upper support portion, so that the lower portion extends across a torso of an adult person seated in the airline seat;
   iii) first loops on ends of the lower support portion for accepting an airline safety seat belt, so that securing of the airline seat belt secures the primary support harness against the torso of the person on the seat;
   b) a secondary support harness comprising at least:
   i) shoulder straps and a waist belt for positioning upon a child seated on the adult's lap;
   ii) second loops on ends of the lower support portion for threading the waist belt therethrough and engaging upon itself around the child, so that the waist belt secures the child in place on the adult's lap.

2. The system in claim 1, further comprising seat belt buckles on the upper support portion for buckling onto the lower support portion of a frame.

3. The system in claim 1, further comprising a frame element on the rear of the secondary support harness for serving as an attachment means between the primary support harness worn by the adult and the secondary support harness worn by the child.

4. The system in claim 3, whereby the frame element comprises a frame to which the shoulder straps of the secondary support harness is secured, and through which an airline seat belt is threaded to hold the harness in place.

5. The system in claim 3, whereby the frame element comprises a frame to which the shoulder straps of the secondary support harness is secured, and through which the airline seat belt is threaded to hold the harness in place.

6. The system in claim 1 further comprising a pad member secured on the waist belt of the secondary support harness placed against the torso of the child for reducing the impact of a sudden stop.

7. The system in claim 1, further comprising a leg strap secured from the frame member and for being threaded through a child's legs to buckle to the belt of the harness for preventing the child from sliding out of the harness in a sudden stop.

8. The system in claim 1, wherein for a smaller child, such as an infant, the secondary support harness may be rotated 180 degrees, so that the leg straps are used as shoulder straps, and a single strap is threaded through the leg of the child for securing the child within the harness.

9. The system in claim 1, further comprising a pad member secured on the waist belt of the secondary support harness placed against the torso of the child for reducing the impact of a sudden stop.

10. A safety restraint system for airplanes, comprising:
 a) a primary support harness, comprising:
  i) an upper support portion for securing to an upper portion of an airline seat;
  ii) a lower support potion buckled to the upper support portion, so that the lower portion extends across a torso of an adult person seated in the airline seat;
  iii) first loops on ends of the lower support portion for accepting the airline safety seat belt, so that securing of the airline seat belt secures the primary support harness against the torso of the person on the seat;
 b) a secondary support harness comprising at least:
  i) shoulder straps and a waist belt for positioning onto a child seated on the adult's lap;
  ii) second loops on the ends of the lower support portion for threading the waist belt therethrough and engaging upon itself around the child, so that the waist belt secures the child in place on the adult's lap;
 c) a frame element on a rear portion of the secondary support harness for serving as attachment means between the primary support harness worn by the adult and the secondary support harness worn by the child; and
 d) the secondary support harness rotatable so that leg straps are used as shoulder straps, and a single strap is threaded between the child's legs for securing the smaller child within the harness.

11. The system in claim 8, further comprising a leg strap secured from the frame member and threaded through the legs of the child to buckle to the belt of the harness for preventing the child from sliding out of the harness in a sudden stop.

12. A secondary restraint system for children, for use in vehicles, comprising:
 a) a primary harness, comprising shoulder straps and a waist belt for securing around the torso of a child;
 b) a rigid frame positioned across the back of the child and extending substantially the width of the child's back, for defining a means for securing the harness to a seat belt of a vehicle, such as an automobile, so that the child is secured in place;
 c) a padded portion, positioned and secured to a front of the waist belt portion for protecting the torso of the child during a sudden stop or impact.

13. The system in claim 12, further comprising a leg strap extending from the frame and through the legs of the child, and attached to a buckle of the waist belt for preventing the child from sliding out of the harness during a sudden stop.

14. The system in claim 12, wherein the harness may be secured to a seat belt of an adult upon whose lap a child is seated in the automobile.

15. A safety restraint system for airplanes, comprising:
 a) a primary support harness for securing an adult onto an airline seat;
 b) a secondary support harness for securing around a torso of a child;
 c) a rigid frame element on the rear of the secondary support harness and extending substantially the width of the child's back for serving as an attachment means between the primary support harness worn by the adult and the secondary support harness secured around the child.

16. The apparatus in claims 15, wherein the primary support harness comprises an upper support portion secured to the upper portion of an airline seat.

17. The apparatus in claim 15, wherein the secondary support harness further comprises shoulder straps and a waist belt for positioning onto a child seated on the adult's lap.

18. The apparatus in claim 15, wherein the primary support harness comprises a lower support portion buckled to the upper support portion, so that the lower portion extends across the torso of an adult person seated in the airline seat.

19. The apparatus in claim 18, wherein the lower support portion further comprises first loops on the ends of the lower support portion for accepting an airline safety seat belt, so that securing of the airline seat belt secures the primary support harness against the torso of the person on the seat.

20. The apparatus in claim 18, wherein the lower support portion further comprises second loops on ends of the lower support portion for threading the waist belt therethrough and engaging upon itself around the child, so that the waist belt secures the child in place on the adult's lap.

* * * * *